US008176610B1

(12) United States Patent
Arrington et al.

(10) Patent No.: US 8,176,610 B1
(45) Date of Patent: May 15, 2012

(54) DEVICE AND METHOD FOR ACCURATE LOCATION AND PLACEMENT OF HOLES IN, AND ATTACHMENT OF COMPONENTS TO, VARIED WORKPIECES

(76) Inventors: Donald L. Arrington, Concord, GA (US); Fred D. Harris, Milner, GA (US)

( * ) Notice: Subject to any disclaimer, the term of this patent is extended or adjusted under 35 U.S.C. 154(b) by 333 days.

(21) Appl. No.: 12/455,206

(22) Filed: May 29, 2009

Related U.S. Application Data

(60) Provisional application No. 61/130,418, filed on May 31, 2008.

(51) Int. Cl.
*B25B 27/14* (2006.01)
*B23Q 3/00* (2006.01)
*B23Q 3/02* (2006.01)

(52) U.S. Cl. ..................... 29/281.1; 29/281.5; 29/281.6; 269/329; 269/291; 269/139; 269/134; 269/289 R

(58) Field of Classification Search ................ 408/72 R, 408/241 G, 115 R, 241 S, 241 B, 89; 29/11, 29/238, 721, 281.1, 897, 897.3, 897.31, 897.312, 29/897.32, 897.34, 525.01, 281.6, 26 R, 281.4, 29/281.5, 26 B; 269/318, 289 R, 74, 42, 269/36, 76, 75, 296, 900, 329, 291, 295, 269/17, 60, 1, 134, 139; 144/307, 286.5, 144/306, 286.1, 287
See application file for complete search history.

(56) References Cited

U.S. PATENT DOCUMENTS 1,935,814 A * 11/1933 Hale Paxton ..................... 100/8
2,559,652 A * 7/1951 Mehltretter ................... 536/124
2,599,652 A * 6/1952 Mitchell ......................... 33/666
3,147,518 A 9/1964 Horgan
3,431,619 A * 3/1969 Bowers, Jr. ..................... 29/822
3,685,916 A * 8/1972 Loomis ....................... 408/72 R
3,689,057 A * 9/1972 Webster .......................... 269/17
3,936,986 A 2/1976 Steel
(Continued)

FOREIGN PATENT DOCUMENTS

JP 01105846 4/1989
(Continued)

OTHER PUBLICATIONS

Meriam-Webster Dictionary, Valve Definition, http://www.merriam-webster.com/dictionary/valve?show=0&t=1321372740.*

(Continued)

*Primary Examiner* — Joseph J Hail
*Assistant Examiner* — Tyrone V Hall, Jr.
(74) *Attorney, Agent, or Firm* — J.T. Hollin, Attorney at Law, P.C.

(57) ABSTRACT

Disclosed is an apparatus, system, and method for precisely placing holes or attaching sub-components to vertical mullions or other workpieces of various shapes and material compositions. The apparatus, in its basic mode of operation, can accurately locate the positions of holes or groupings of holes to be drilled in the workpiece by means of the calibrated positioning, along the workpiece, of a plurality of fixtures affixed to specially-designed drill guide plates. When used in its advanced mode of operation, the fixtures of the apparatus are re-configured and loaded with a plurality of shear blocks or other connectors, and thereupon an operator, by calibrated placement of the fixtures, may simultaneously pinpoint the required fastening location of the shear blocks and sequentially attach specified fasteners through each shear block, directly onto the workpiece.

4 Claims, 9 Drawing Sheets

U.S. PATENT DOCUMENTS

| | | | | |
|---|---|---|---|---|
| 3,961,452 | A | 6/1976 | Hubbard et al. | |
| 4,105,055 | A * | 8/1978 | Brenta | 144/286.1 |
| 4,153,384 | A * | 5/1979 | Isaken | 408/115 R |
| 4,330,921 | A * | 5/1982 | White, Jr. | 29/432 |
| 4,712,345 | A | 12/1987 | Kaminaga | |
| 5,120,378 | A * | 6/1992 | Porter et al. | 156/91 |
| 5,144,994 | A * | 9/1992 | Stecker, Sr. | 144/286.5 |
| 5,365,645 | A | 11/1994 | Farag | |
| 5,954,461 | A * | 9/1999 | Lemieux | 408/115 R |
| 6,068,543 | A * | 5/2000 | Renn | 451/67 |
| 6,158,182 | A | 12/2000 | Biebuyck | |
| 6,226,940 | B1 | 5/2001 | Biebuyck et al. | |
| 6,283,685 | B1 * | 9/2001 | Lemieux | 408/115 R |
| 6,550,196 | B2 | 4/2003 | Braybrook | |
| 6,561,065 | B2 | 5/2003 | Renalli | |
| 6,715,248 | B2 | 4/2004 | Biebuyck | |
| 6,748,709 | B1 | 6/2004 | Sherman et al. | |
| 6,860,800 | B1 * | 3/2005 | Maurer | 451/364 |
| 6,993,873 | B2 | 2/2006 | Biebuyck | |
| 7,036,280 | B2 | 5/2006 | Hogan | |
| 2002/0056306 | A1 * | 5/2002 | Cleave et al. | 72/324 |
| 2005/0045012 | A1 * | 3/2005 | Nien | 83/517 |
| 2005/0098232 | A1 * | 5/2005 | Logan | 144/287 |
| 2007/0199261 | A1 | 8/2007 | Lang | |
| 2008/0236350 | A1 | 10/2008 | Liu | |

FOREIGN PATENT DOCUMENTS

| | | |
|---|---|---|
| JP | 05230917 | 9/1993 |
| JP | 09144187 | 6/1997 |

OTHER PUBLICATIONS

Shear Block Fabrication USAluminum Rev Mar. 2005.
Trifab400 Kawneer Co Inc Aug. 2007.

* cited by examiner

DEVICE AND METHOD FOR ACCURATE LOCATION AND PLACEMENT OF HOLES IN, AND ATTACHMENT OF COMPONENTS TO, VARIED WORKPIECES

CROSS-REFERENCE TO RELATED APPLICATIONS

This patent application claims the benefit of U.S. Provisional Application No. 61/130,418 filed on May 31, 2008.

STATEMENT REGARDING FEDERALLY SPONSORED RESEARCH OR DEVELOPMENT

There is no federally sponsored research or development in connection with this inventive concept.

NAMES OF THE PARTIES TO A JOINT RESEARCH AGREEMENT

There is no joint research agreement applicable to this inventive concept.

BACKGROUND OF THE INVENTION (1) Field of the Invention

The present invention, among other uses and applications, primarily relates to an improved method and system for precisely connecting components of curtain walls. Curtain walls are typically constructed by the assembly of support members comprising a complete frame for the support of a plurality of panels which, in turn, serve as a substantial part of the exterior of a building. The panels themselves may be of glass, granite, slate, concrete, or other materials.

The curtain walls will normally include a horizontal sill member, a horizontal head member, and numerous vertical mullions running between the sill and head members. Panel members are supported by grooved or u-shaped channels within the sill members and the head members. In some manufacturing processes screw splines or other integral mechanisms are fabricated within the interior of the mullion or usually, some portion of a shear block, to facilitate the attachment of horizontal members to the mullion or the attachment of the mullion to a concrete floor slab in a building under construction.

A common construction method involves the attachment of components such as shear blocks or clips to appropriate locations on the exterior or interior of vertical mullions. The horizontally-oriented head and sill members are thereafter affixed to the shear blocks, forming joints and support for the panel members. The present invention may be quickly and efficiently used to more precisely locate the drilling points for attachment holes on a vertical mullion or other workpiece. The inventive concept herein is also designed to simultaneously pinpoint the location of the necessary holes and apply the required fasteners through the shear block directly into the mullion.

(2) Description of the Related Art

Many different techniques and systems have been developed over the past fifty years for the purpose of constructing, assembling, and attaching vertical mullions, sills, head members, and the enclosed panel members to the structure of buildings. U.S. Pat. No. 3,147,518 (Horgan, 1964) was one of the earliest exhibiting the construction of curtain walls utilizing mullions comprised of extruded aluminum. The method disclosed drilling holes into the mullion and afterwards, the insertion of self-tapping screws to unite the mullion with horizontal members. Another consideration involved the factor of insulation and waterproofing, thus caulking was used extensively during construction.

As the various designs and means of connecting and securing frame members to each other and to the building structure evolved, the majority of methods were very similar. U.S. Pat. No. 3,961,452 (Hubbard et al, 1976) speaks of a screw spline system. The vertical mullions are drilled with holes in the appropriate places to receive shear pins. The horizontal members were attached by the insertion of the shear pins into screw splines formed in the horizontal member. The heads of the shear pins are then tapped downward until the shear pins bottom in the holes previously drilled in the mullions.

A stopless butt-joint multiple curtain wall system was disclosed in U.S. Pat. No. 5,355,645 (Farag, 1994) wherein a grid system is constructed from within a building under construction. One of the claims featured split mullion interlocking halves, each half secured to the other by interconnection of male to female connectors. Clips and retainers were also utilized for panels and receiving mullion, thus for the most part eliminating the need to drill holes.

In U.S. Pat. No. 6,158,182 (Biebuyck, 2000), disclosed is a method of assembling a curtain wall in a controlled environment within a factory, thus yielding more precision, higher tolerances, and lower labor costs. Completed sections of curtain wall then are transported to the building site for attaching to the building structure. Each mullion member has extruded splines on its interior surface and an exterior shelf. Sills, heads, and intermediate horizontal members have similar structures which include pressure plates. The pressure plates contain holes which correspond with holes drilled on the exterior shelf of the mullion. The method also emphasizes an efficient means of anchoring curtain walls to a slab or structure.

A hollow body hole punching apparatus is disclosed in U.S. Pat. No. 6,561,065 Ranalli, 2003) wherein an "elongated hollow body" or mullion is described as the typical workpiece. An expandable die is inserted into the mullion which rests upon a support table. A positioning bar is connected to the die and manipulates the mullion into alignment with an overhead punch press. The die, which is fabricated with die cavities, is then mechanically expanded, thus preventing collapse of the mullion as the holes are punched.

BRIEF SUMMARY OF THE INVENTION

The present invention, among other uses and applications, relates to an apparatus which makes possible an improved method and system for assembling and anchoring components of curtain walls. The apparatus essentially is an elongated worktable comprised of two parallel and horizontally running support rails. The support rails are attached to a plurality of steel channel legs, with the entire assemblage forming a railed platform. The railed platform further contains, directly behind and parallel to its rearmost rail, a backstop which supports a plurality of pivotable, metallic fixtures. The fixtures are orthogonally attached to the top surface of the backstop at intervals dictated by a construction drawing. The metallic fixtures can function as either jigs or tool guides.

Prior to operating the device in its basic drilling mode, a plurality of planar drill plates are machined with patterns and/or groupings of holes corresponding to designated attachment points on a subject workpiece. The drill plates are secured to appropriate fixtures, normally by a threaded attachment means. Once the workpiece is placed horizontally upon the railed platform and secured against the backstop, the fixtures are slidingly positioned and clamped at precise positions, according to scalar measurements on the backstop. Each fixture is then pivotally rotated to horizontally interface with the workpiece. Thereby, an operator may accurately drill the required holes, using the drill plates as a jig, or guide.

In the advanced mode of operation the step of drilling holes into the workpiece is eliminated by the utilization of a different type of fixture. These re-configured fixtures are attached to loading plates, which plates are designed to graspingly hold shear blocks. The loading plates are custom-fabricated of such size and contour as to permit a specific shear block to be securely grasped within the inner perimeter of the loading plate. Similar to the basic mode of operation, the fixtures are positioned and clamped at exact positions upon the backstop, and rotated downward, flush with the workpiece. An operator, using manual or overhead automated equipment and the required fasteners, accurately attaches each shear block directly to the mullion at the location of each horizontally-positioned fixture.

The reader is advised that, for the sake of convenience and clarity, the operation of this device has been described primarily with vertical mullion as being the subject workpiece. However, the inventive concept is suitable for precise drilling and related operations on a variety of materials and objects of primarily planar dimensions. Therefore, the descriptions rendered herein are not considered to be restrictive or limiting of the operation of the device.

BRIEF DESCRIPTION OF THE VIEWS OF THE DRAWINGS

A more thorough understanding of the present invention and fabrication system may be had by reference to the drawings herein, of which a brief summation of each drawing follows:

FIG. 8(*a*) presents an isometric view, from an operator's position, of the vertical, disengaged position of the flip-up fixture as it is clamped to the backstop.

| NUMERICAL INDEX TO NOMENCLATURE OF APPARATUS PARTS | |
|---|---|
| 1. | Footing |
| 2. | Steel channel leg |
| 3. | Leg extension |
| 4. | Front rail bed |
| 5. | Rear rail bed |
| 6. | Backstop |
| 7. | Backstop mounting bracket |
| 8. | Endstop |
| 9. | Fixed tape measure |
| 10. | Flow control valve |
| 11. | Vertical adjustment slot |
| 11(a) | Vertical adjustment bolt |
| 12. | Pneumatic cylinder mount bracket |
| 13. | Pneumatic cylinder |
| 14. | Pneumatic line |
| 15. | Manual control lever |
| 16. | Cylinder snubber |
| 17. | Non-mar support |
| 17(a) | Support slot |
| 18. | Flip-up fixture/load plate |
| 19. | Fixture mounting base |
| 20. | Fixture arm |
| 21. | Fixture loading plate |
| 22. | Dowel pin |
| 23. | Backstop clamping setscrew |
| 24(a) | Left angle adjustment setscrew |
| 24(b) | Right angle adjustment setscrew |
| 25(a) | Left fore-aft adjustment screw |
| 25(b) | Right fore-aft adjustment screw |
| 26(a) | Top socket-head cap screw |
| 26(b) | Lower socket-head cap screw |
| 27. | Middle socket-headed cap screw |
| 28. | Spring-loaded plunger |
| 29. | Hole position locator |
| 30. | Locator adjusting rod |
| 31. | Leading edge of hole locator |
| 32. | Trailing edge of hole locator |
| 33. | Fixture load |
| 34. | Drill plate |
| 34(a) | Drill plate guide hole |
| 35. | Flip-up fixture/drill plate |
| 36. | Mullion |
| 37. | Workpiece |
| 38. | Shear block |
| 39. | n/a |
| 40. | Railed platform |
| 41. | Open space |
| 42. | Line from compressor |
| 43. | Supply line |
| 44. | Hole/attachment pattern |
| 45. | Reference baseline |
| 46. | Calibrating mark |
| 47. | Threaded fastener |

DETAILED DESCRIPTION OF THE INVENTION

Figure 1:
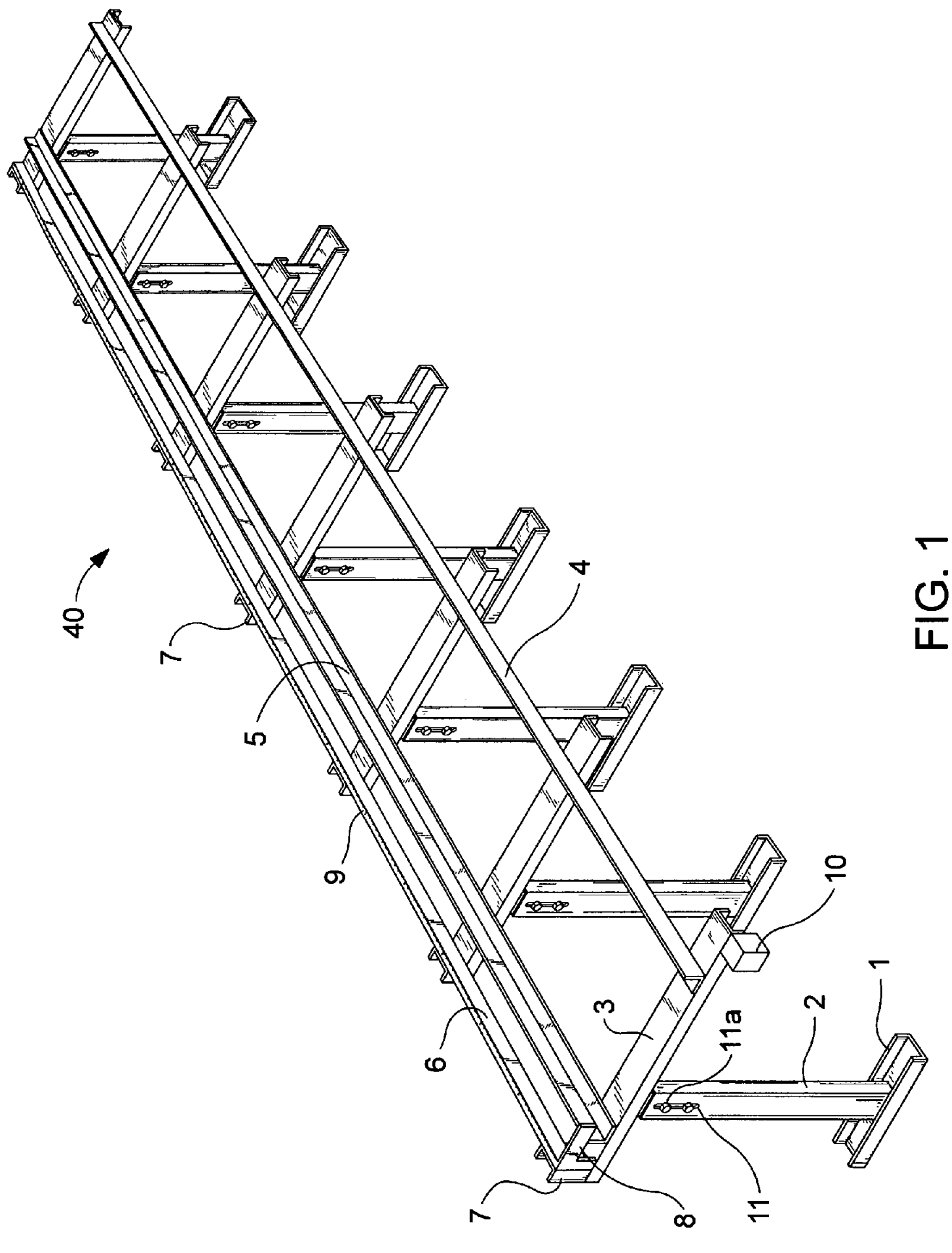
FIG. 1 is a view, in perspective, of the basic railed platform, less the tooling, pneumatic cylinders, and moveable fixtures required for operation.
Figure 2:
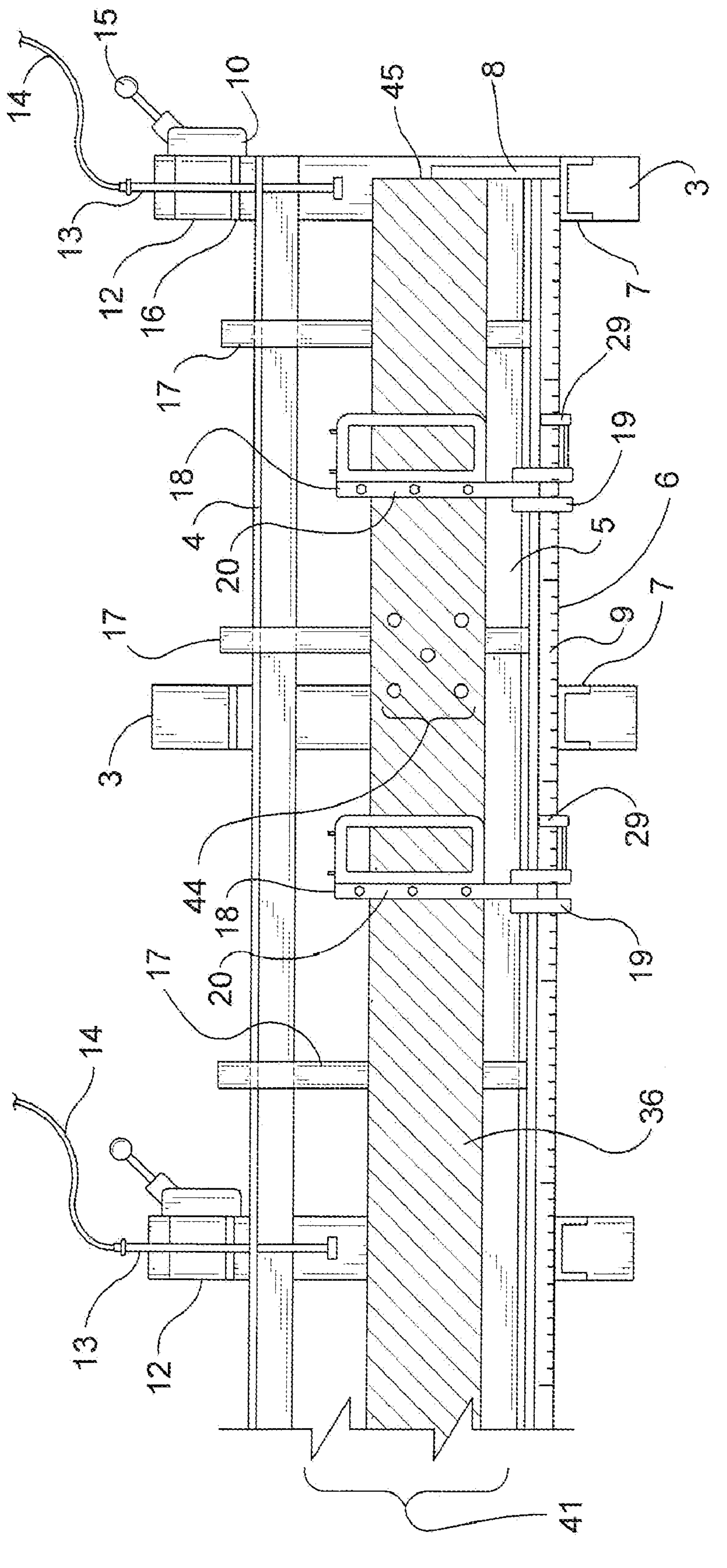
FIG. 2 depicts a plan view of a section of the railed platform, in which (a) two pneumatic cylinders and (b) two fixtures attached to empty loading plates are shown.

In referring first to FIG. 1, the railed platform 40 constitutes the basic structure of the apparatus. The front rail bed 4 and rear rail bed 5 are arranged parallel to each other and are securely bolted to a series of regularly-spaced horizontal leg extensions 3, which are in turn anchored upon steel channel legs 2 and footings 1. A continuous linear backstop 6 is arranged just aft of, and parallel to, the rear rail bed 5. The backstop 6 is permanently attached proximate to the rear end of each leg extension 3 by means of backstop mounting brackets 7. An L-shaped endstop 8 is welded to the leftmost end of the backstop 6. The endstop 8 comprises a baseline for longitudinal measurements and is used as a zero reference for all computations for the location of attachments and/or placement of drill holes along the surface of a workpiece 37. FIG. 2 further clarifies the positioning of a vertical mullion 36 or workpiece 37 as it is being positioned upon the railed platform 40.

Figure 3:
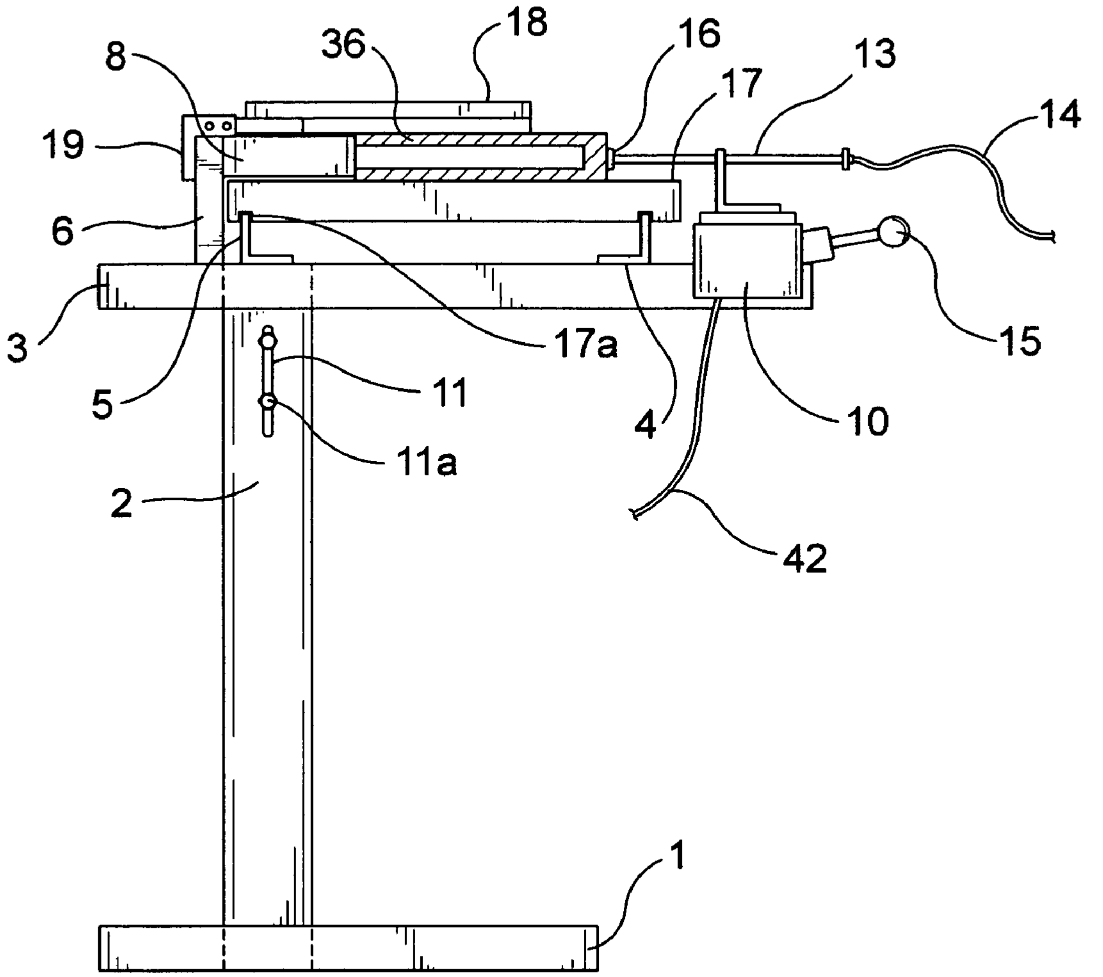
FIG. 3 presents the side elevation view of the calibrating end of the railed platform of FIG. 2, further depicting the cross section of a typical workpiece.

Adhesively attached to the top surface of the backstop 6, and running its entire length, is a fixed tape measure 9. To ensure an exact horizontal orientation of the subject workpiece 37, each of the steel channel legs 2 features a vertical adjustment slot 11 and vertical set bolts 11(*a*), as is depicted in FIG. 3. The vertical adjustment slots 11 serve as a means of compensating for possible unevenness of any floor surface upon which the railed platform 40 may be placed.

For the sake of easier visualization, and by no means indicative of any limitations of the apparatus, the descriptions herein of the operation of the apparatus shall be predicated upon a vertical mullion 36 being the subject workpiece 37.

Figure 11:
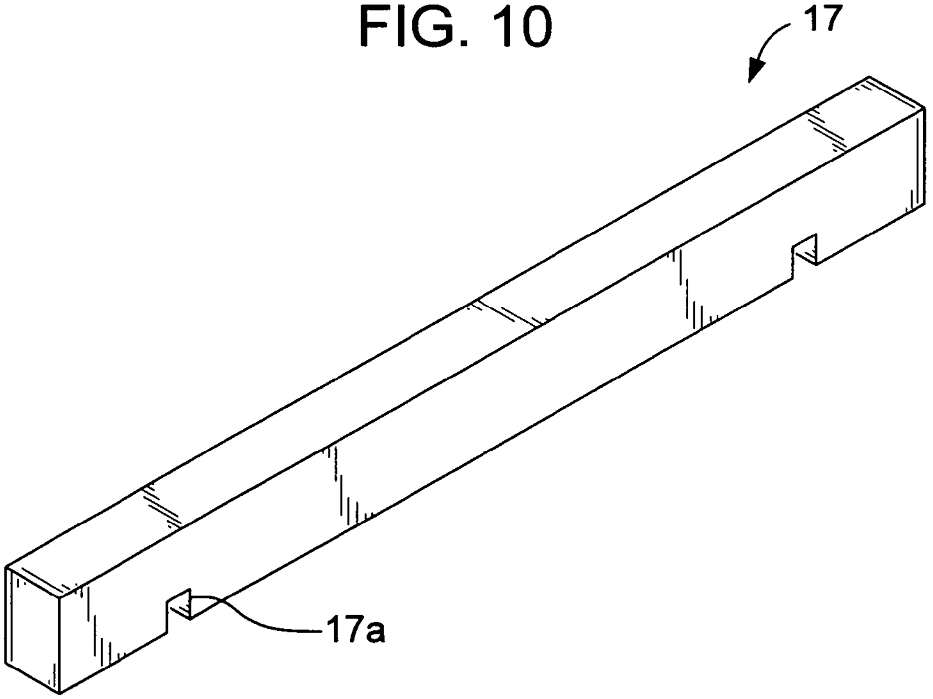
FIG. 11 illustrates one of a plurality of non-mar supports designed to slidingly fit over the front and rear rails of the apparatus while supporting a workpiece.

Again referring to FIG. 2 there is shown a plurality of non-mar supports 17 which, as shown in FIG. 3, are constructed with two slots 17(*a*) cut into the lower surface. The non-mar supports 17 prevent abrasive damage to the workpiece 36, 37 during positioning and operations. The said slots 17(*a*) allow the non-mar supports 17 to slidingly and snugly fit over the front rail bed 4 and rear rail bed 5. A further view of the non-mar support 17 is also shown in FIG. 11.

The mullion 36, while subject to operational functions performed thereon, rests on the non-mar supports 17 along the length of the railed platform. The rail beds 4, 5 display open space 41 between their parallel runnings, such open spacing 41 permitting axial rotation of the mullion 36 upon the non-mar supports 17 in the course of attaching components. Thusly, there is allowed bottomward clearance for the firstly-attached components while the opposite surface of the mullion 36 is being worked upon.

In FIG. 2 and FIG. 3, there appears a box-like structure as symbolic representation of a pneumatic flow control valve 10, said flow control valve 10 functioning in essence as any of a number of such valves currently in use. A compressor 42 supplies pressurized air, via a supply line 43, to the flow control valve 10. Upon the opening of a manual control lever 15, the pressurized air is ported through pneumatic lines 14 to a plurality of pneumatic cylinders 13. A pneumatic cylinder 13 is mounted, by means of a pneumatic cylinder mount bracket 12, upon the top front surface of each leg extension 3. Referring to FIG. 3, once a workpiece 37 is placed into position on the non-mar supports 17, the pneumatic cylinders 13 are pressurized, thereby forcing the cylinder snubber 16 securely against the workpiece 37.

Basic Mode of Operation

Figure 4:
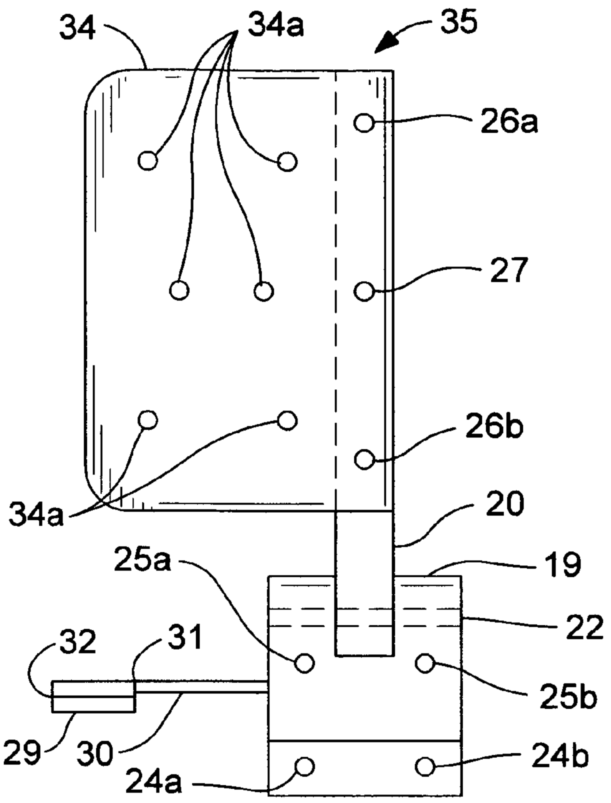
FIG. 4 illustrates the front interfacing surface of a typical drill plate as attached to the arm of a fixture, along with the hole position locator.
Figure 5:
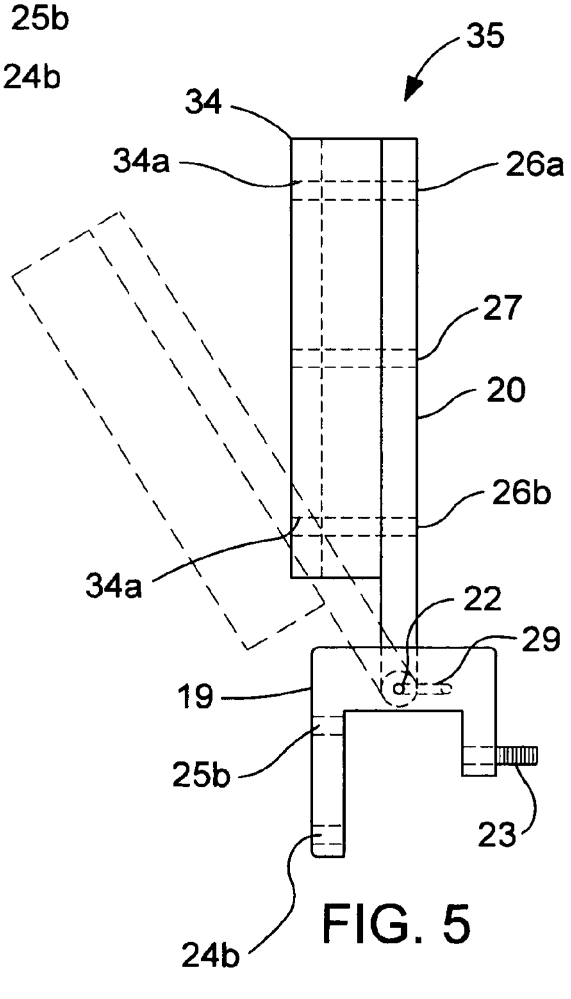
FIG. 5 is a side view of the flip-up fixture/drill plate assembly, including a prospective view of the assembly transitioning to its horizontal operating position.

The basic working mode of the apparatus consists of pinpointing the precise location and arrangement of holes to be drilled into a vertical mullion 36 or workpiece 37, in conjunction with the operation of automated or hand-held drill equipment to drill the holes. Assuming, for illustrative purposes, that the workpiece 37 is a vertical mullion 36, detailed shop drawings are first consulted to determine the pattern, number, dimensions, and location of holes required for the attachment of horizontal members at more or less regular intervals along the length of the mullion 36. For each intervallic location along the length of the mullion 36, one or more drill guides, or drill plates 34, as shown in FIG. 4 and FIG. 5, are then fabricated. Each drill plate 34 is itself through-drilled with the prescribed number and pattern of holes 34(*a*) corresponding to the hole/attachment pattern 44 of a corresponding intervallic location. Each said intervallic location comprises a concise area wherein a horizontal structural member will be attached to the vertical mullion 36. FIG. 2 displays a hole/attachment pattern 44 as it would appear after having been drilled into a workpiece 37.

The drill plates 34 are composed of hardened steel to withstand the heat of the drill mechanism and to minimize gouging of the rim of the drill hole guides 34(*a*) which may possibly be caused by repetitive drilling operations. The drill plates 34 are further fabricated with a lengthwise dimension commensurate with the length of the fixture arm 20, facilitating the attachment of the drill plate 34, by means of socket-headed cap screws 26(*a*), (*b*) to a fixture arm 20, as shown in FIG. 4. Each drill plate 34, having been drilled to match the attachment points at a particular intervallic location and attached to a fixture arm 20, forms a flip-up fixture/drill plate 35.

By referring to FIG. 2, a description of the necessary drilling operations begins with the mullion 36 being placed upon the non-mar supports 17, parallel to the rear rail bed 5. In FIG. 3, the mullion 36 has been pressed firmly against the endstop 8 and the backstop 6 of the railed platform. An operator then moves the control lever 15 toward the open position, allowing pressurized air from the compressor 41 to enter all pneumatic lines 14. As the pneumatic pressure increases, the pneumatic cylinders 13 are displaced inward toward the lateral surface of the mullion 36. The pneumatic cylinder snubbers 16 make contact against the surface of the mullion 36, in effect, causing the entire length of the opposite surface of the mullion 36 to be secured against the backstop 6.

Figure 8:
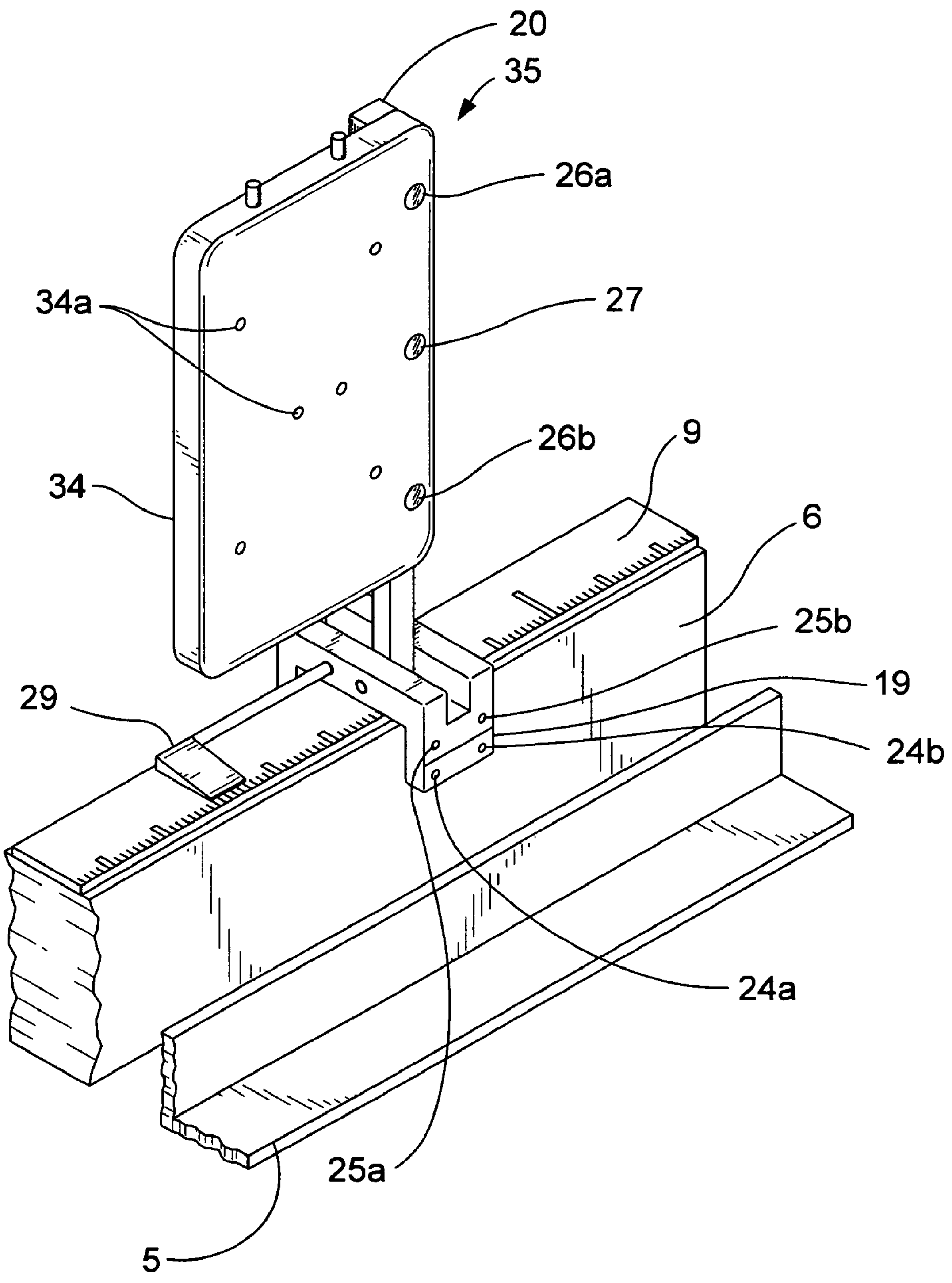
FIG. 8 illustrates an isometric view of the flip-up fixture/drill plate, the assembly having been rotated upwards to its vertical, disengaged position.
Figure 8A:
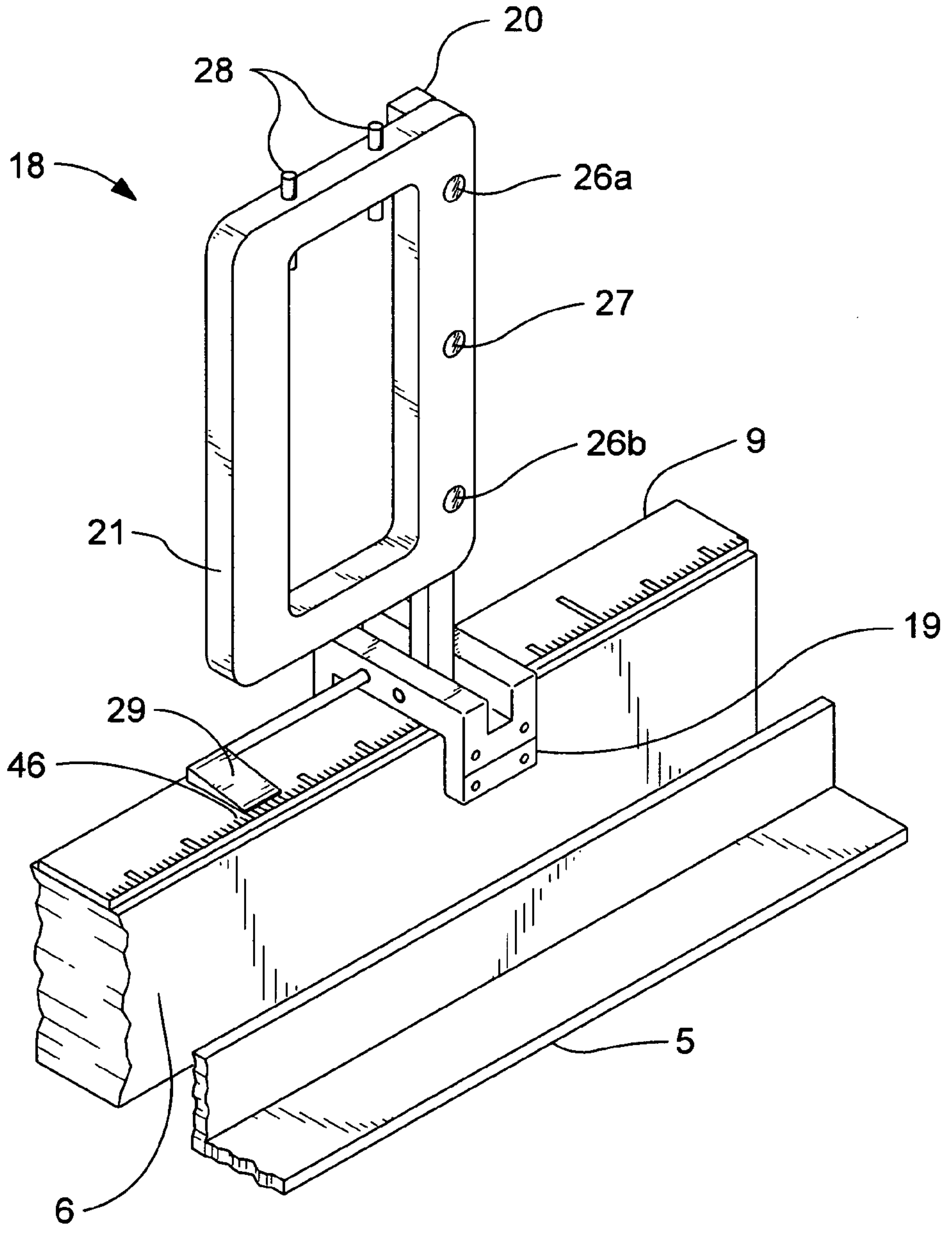

Each flip-up fixture/drill plate 35 is thereupon placed at a first position upon the backstop 6 approximating the specified location of the hole/attachment pattern 44 in the vertical mullion 36. FIG. 8 depicts the placement of a flip-up fixture/drill plate 35 at its first approximate position on the backstop 6. The exact location of each drill plate 34 along the length of the mullion 36 is set by aligning the hole position locator 29 attached to the base 19 of the flip-up fixture/drill plate by referencing the fixed tape measure 9. The final positioning and clamping of each flip-up fixture/drill plate 35 is accomplished on the backstop 6 by adjustment of the left and right angle adjustment setscrews 24(*a*) and 24(*b*) and the left and right fore-aft adjustment screws 25(*a*), 25(*b*).

The flip-up fixture/drill plate 35 is then rotated downward toward its engaged position, that is laying in a horizontal position, parallel to and proximate to, a workpiece 37. As a means of similarity and comparison, FIG. 3 depicts a typical flip-up fixture 18 of the type utilized in conjunction with the invention, in its engaged position; that is, pivoted downward into a horizontal posture and almost flush with the surface of the mullion 36. At this point, an operator utilizes a manual drill or automated overhead drill equipment to drill each hole in accord with the drill plate guide holes 34(*a*).

Advanced Mode of Operation

The attachment of horizontal members to a vertical mullion 36 is greatly enhanced by the advanced operating features of this apparatus. The location of the points of attachment of shear blocks 38, or other horizontal members, and the actual fastening of such components is done more rapidly and with greater precision. Again, it will be assumed, for demonstrative purposes and not as an indication of limitations of the apparatus, that the workpiece 37 is a vertical mullion 36, and the horizontal members are shear blocks 38.

Firstly, detailed shop drawings are consulted to determine (1) the metal characteristics, dimensions, and profile of each shear block 38, and (2) the exact location and orientation, along the length of the mullion 36, of attachment points for each type of shear block 38 used in the curtain wall assembly.

Figure 6:
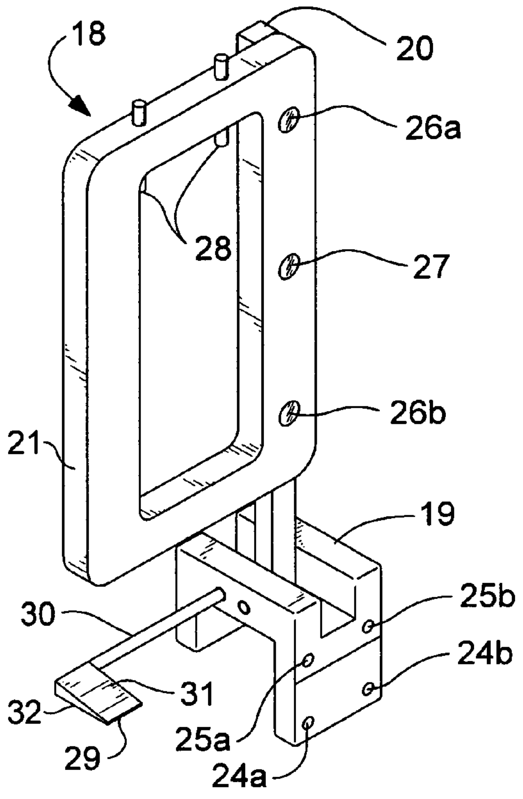
FIG. 6 is a perspective view of a flip-up fixture in its vertical disengaged position and further illustrating the attached hole position locator.
Figure 7:
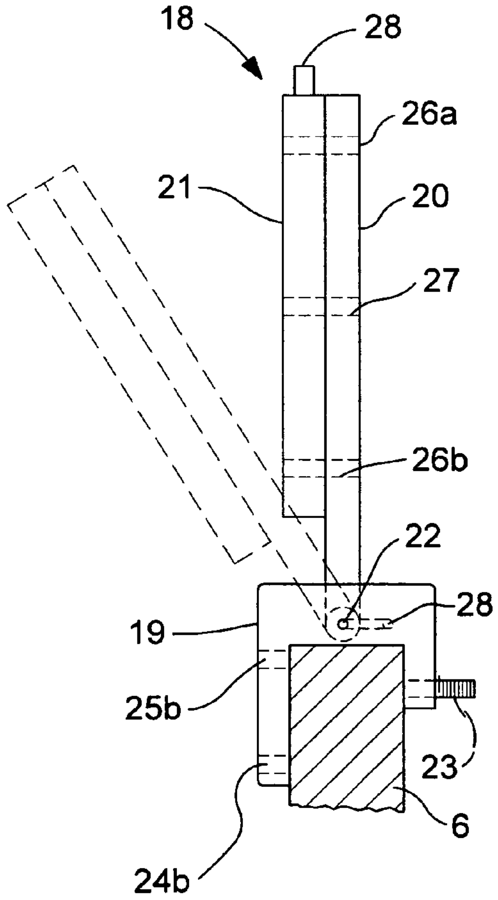
FIG. 7 is the side view of FIG. 6, further depicting an intermediate position of the fixture transitioning to a horizontal engaged position with a workpiece.
Figure 9:
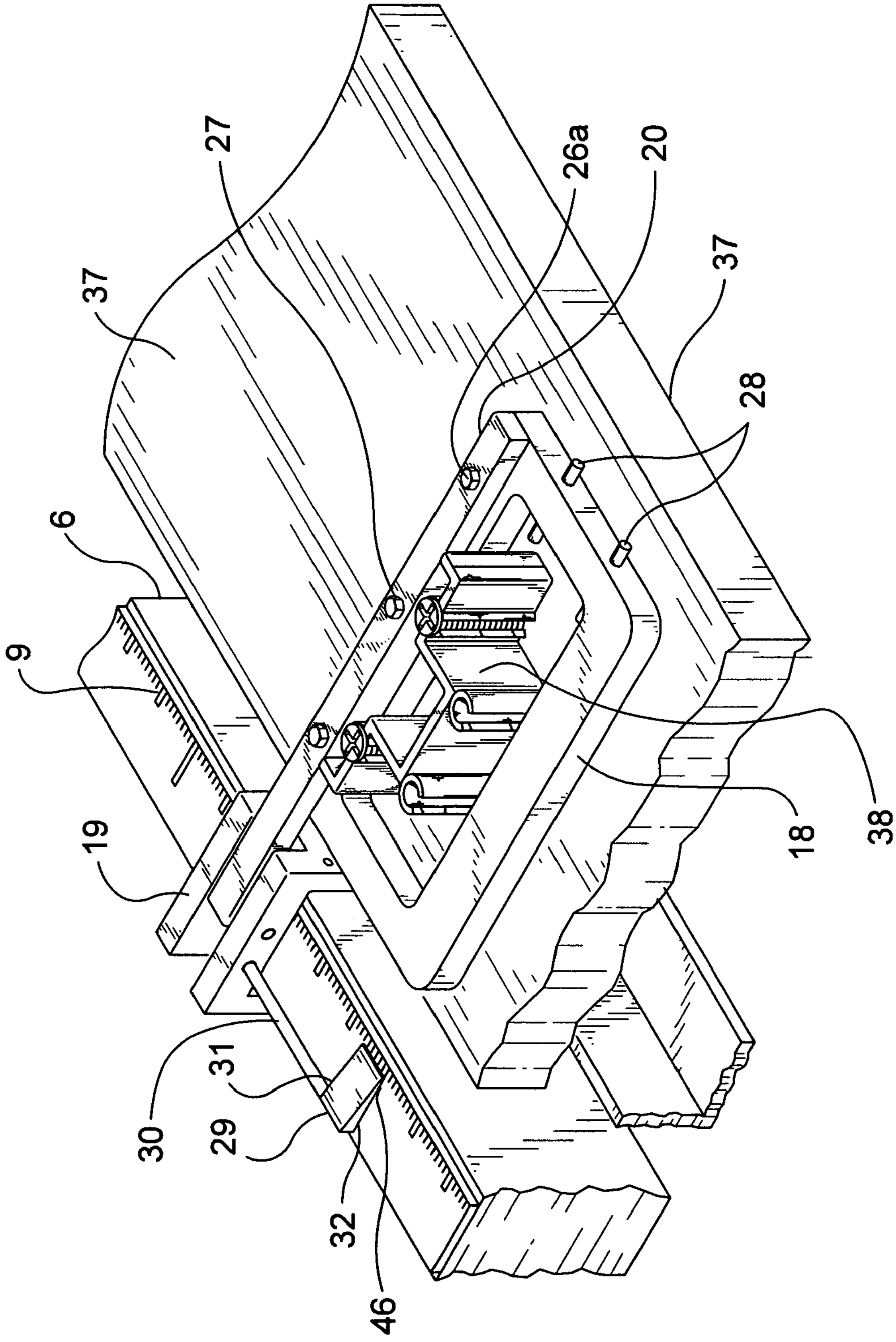
FIG. 9 depicts a flip-up fixture containing, within its inner perimeter, a shear block. The assembly has been pivoted so as to interface with a workpiece.
Figure 10:
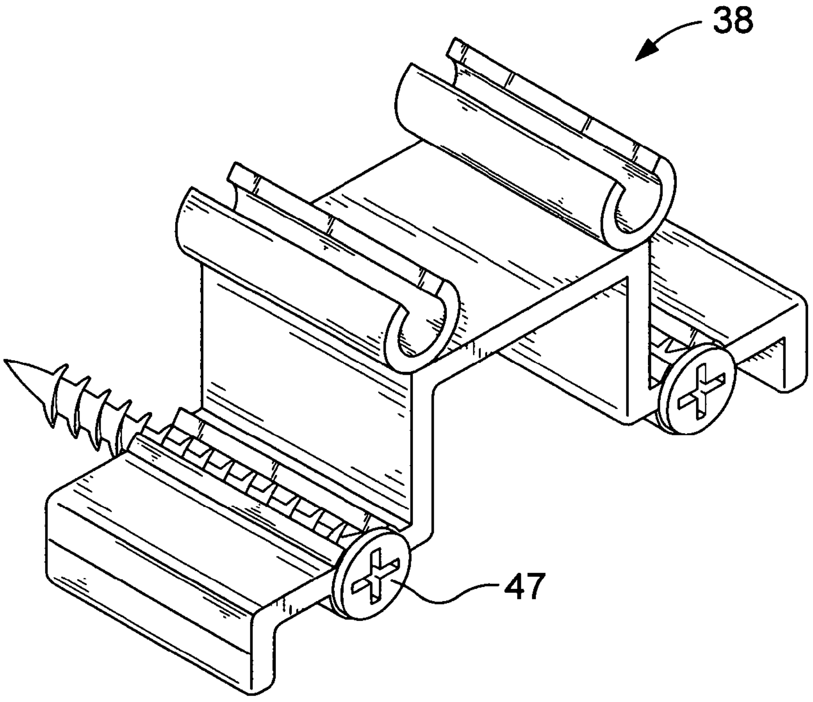
FIG. 10 is a rendering of a fastener commonly used to attach shear blocks to a vertical mullion.

This information is used to fabricate one or more fixture loading plates 21, as illustrated in FIG. 6 and FIG. 7. Each fixture loading plate 21 is precisely machined with the lateral and longitudinal dimensions to interiorly encompass the corresponding perimeter of each particular shear block 38 required to be attached to the vertical mullion 36. Each fixture loading plate 21 is further fabricated with a longitudinal dimension commensurate with the length of the fixture arm 20 to which the fixture loading plate 21 will be attached. When these two components are attached by means of socket-headed cap screws 26(*a*), (*b*), 27, the completed unit will comprise the flip-up fixture assembly 18, as shown in FIG. 6 and FIG. 7. FIG. 9 illustrates the manner in which a typical shear block 38 may be loaded into a flip-up fixture 18.

After completion of construction of the required flip-up fixtures 18, the mullion 36 is then secured to the railed platform in the same manner as in the basic mode of operation. By reference to the applicable construction drawings, precise measurements are obtained, defining the locations of the various attachment points for each type of shear block 38 required to be attached to the mullion 36. Using these measurements, a reference baseline 45, in relation to the bottom of the mullion 36 is established at the apparatus endstop 8, as shown in FIG. 2. From the reference baseline 45, a calibrating mark 46, as shown in FIG. 8(*a*) and in FIG. 9, is determined at a corresponding point on the fixed tape measure 9. The calibrating mark 46 represents a specific longitudinal measurement of the point at which the leading edge 31 of the hole position locator 29 must be aligned to precisely place the flip-up fixture 18 and its corresponding shear block 38 directly over the required attachment point on the mullion 36. These measurements and placement points are illustrated in FIG. 9.

Each sequential flip-up fixture 18 is thereafter placed at a first position along the backstop 6 approximating the specified location of the attachment point of the shear block 38. FIG. 8(*a*) depicts the placement of a flip-up fixture 18 at its first approximate position. The flip-up fixtures 18 are in turn calibrated by setting the leading edge 31 of each respective hole position locator 29 to its corresponding calibrating mark 46. This calibration will coincide with the mullion 36 attachment point of the shear block 38 with which the flip-up fixture 18 is loaded.

The final positioning and clamping of each flip-up fixture 18 is accomplished on the backstop 6. Each flip-up fixture 18 is next manually pivoted downward into a horizontal posture, proximately flush with the surface of the mullion 36.

As necessary, adjustments are made to ensure an orthogonal, or an angular, orientation of the base 19 of the flip-up fixture 18 relative to the longitudinal dimension of the workpiece, which in turn assures proper orthogonal (or angular) attachment of the shear block 38 to the mullion 36. The said adjustments are accomplished manually by either clockwise or counter-clockwise rotations of the fore and aft adjustment screws, 25(*a*), (*b*) depicted in FIG. 6 and FIG. 7.

After completion of all adjustments, an operator utilizes a manual drill or automated overhead drill equipment, along with the appropriate threaded fasteners 47 to attach each shear block 38, in sequence, to the vertical mullion 36.

What is claimed is:

1. A work platform for use in the drilling of holes in, and/or attachment of components to, an object or workpiece, comprising a) a plurality of legs, each orthogonally attached to a horizontally-arranged footing;

b) a plurality of leg extensions;

c) a horizontal front rail bed and a horizontal rear rail bed, each rail bed level with, and parallel to the other;

d) a plurality of non-mar supports;

e) a backstop with an endstop orthogonally-attached to one end of said backtop;

f) a linear tape measure attached to the top surface of said backstop;

g) a plurality of pneumatic cylinders;

h) a pneumatic pressurizing system, wherein said footings rest horizontally on a floor or other surface with said legs extending vertically upward to engage attachment means on said horizontally-oriented leg extensions, said leg extensions being attached to, and supportive of, (i) said front rail bed, (ii) said rear rail bed, and (iii) said backstop, whereby said rail beds underlie a plurality of slotted non-mar supports; and further, said pneumatic pressurizing system comprises a compressor, a supply line routing compressed air to a flow control valve, whereby said flow control valve ports said compressed air to said pneumatic cylinders, with a single said pneumatic cylinder being slidingly attached to the top surface of each horizontal leg extension, and further comprising i) a plurality of flip-up fixture/drill plates, each said flip-up fixture/drill plate having a hole position locator, a fixture mounting base, with said fixture mounting base having a means for linearly positioning said fixture mounting base along the top surface of said backstop and said fixture mounting base further enabling pivotable positioning of each flip-up fixture/drill plate by means of adjustable fasteners imbedded in said fixture mounting base.

2. A work platform for use in the drilling of holes in, and/or attachment of components to, an object or workpiece, comprising a) a plurality of legs, each orthogonally attached to a horizontally-arranged footing;

b) a plurality of leg extensions;

c) a horizontal front rail bed and a horizontal rear rail bed, each rail bed level with, and parallel to the other;

d) a plurality of non-mar supports;

e) a backstop with an endstop orthogonally-attached to one end of said backtop;

f) a linear tape measure attached to the top surface of said backstop;

g) a plurality of pneumatic cylinders;

h) a pneumatic pressurizing system, wherein said footings rest horizontally on a floor or other surface with said legs extending vertically upward to engage attachment means on said horizontally-oriented leg extensions, said leg extensions being attached to, and supportive of, (i) said front rail bed, (ii) said rear rail bed, and (iii) said backstop, whereby said rail beds underlie a plurality of slotted non-mar supports; and further, said pneumatic pressurizing system comprises a compressor, a supply line routing compressed air to a flow control valve, whereby said flow control valve ports said compressed air to said pneumatic cylinders, with a single said pneumatic cylinder being slidingly attached to the top surface of each horizontal leg extension, and further comprising i) a plurality of flip-up fixture/load plates, wherein each said flip-up fixture/load plate contains a fixture mounting base, with said fixture mounting base having a means for linearly positioning said fixture mounting base along the top surface of said backstop and said fixture mounting base further enabling pivotable positioning of each flip-up fixture/load plate by means of adjustable fasteners imbedded in said fixture mounting base.

3. A method of drilling holes in precise locations designated on a workpiece, comprising the sequential steps of (a) constructing a work platform for use in the drilling of holes in, and/or attachment of components to, an object or workpiece, said work platform comprising i) a plurality of lees, each orthogonally attached to a horizontally-arranged footing;

ii) a plurality of leg extensions;

iii) a horizontal front rail bed and a horizontal rear rail bed, each rail bed level with, and parallel to the other;

iv) a plurality of non-mar supports;

v) a backstop with an endstop orthogonally-attached to one end of said backtop;

vi) a linear tape measure attached to the top surface of said backstop;

vii) a plurality of pneumatic cylinders;

viii) a pneumatic pressurizing system, wherein said footings rest horizontally on a floor or other surface with said legs extending vertically upward to engage attachment means on said horizontally-oriented leg extensions, said leg extensions being attached to, and supportive of, said front rail bed, said rear rail bed, and said backstop, whereby said rail beds underlie a plurality of slotted non-mar supports; and further, said pneumatic pressurizing system comprises a compressor, a supply line routing compressed air to a flow control valve, whereby said flow control valve ports said compressed air to said pneumatic cylinders, with a single said pneumatic cylinder being slidingly attached to the top surface of each horizontal leg extension; and with said work platform further comprising a plurality of flip-up fixture/drill plates, each said flip-up fixture/drill plate having a hole position locator, a fixture mounting base, with said fixture mounting base having a means for linearly positioning said fixture mounting base along the top surface of said backstop and said fixture mounting base further enabling pivotable positioning of each flip-up fixture/drill plate by means of adjustable fasteners imbedded in said fixture mounting base;

(b) determining the location and dimension of holes required to be drilled into said workpiece;

(c) placing the appropriate surface of said workpiece against said backstop of said work platform, while simultaneously positioning the end of said workpiece abut the endstop;

(d) securing said workpiece by means of said pneumatic cylinders;

(e) slidingly positioning said flip-up fixture/drill plate along said backstop by means of said hole position locator and said linear tape measure;

(f) pivotably rotating said flip-up fixture/drill plate into a horizontal orientation proximate said workpiece;

(g) securing said flip-up fixture/drill plate onto a fixed position on said backstop by means of said adjustment screws; and (h) performing the required drilling operation through each said hole position locator.

4. A method of attaching components at a precise location (s) designated on a surface of a workpiece, comprising the sequential steps of (a) constructing a work platform for use in the drilling of holes in, and/or attachment of components to, an object or workpiece, said work platform having at least one flip-up fixture/load plate having internal contours corresponding to the external contours of said component, and further comprising i) a plurality of legs, each orthogonally attached to a horizontally-arranged footing;

ii) a plurality of leg extensions;

iii) a horizontal front rail bed and a horizontal rear rail bed, each rail bed level with, and parallel to the other;

iv) a plurality of non-mar supports;

v) a backstop with an endstop orthogonally-attached to one end of said backtop;

vi) a linear tape measure attached to the top surface of said backstop;

vii) a plurality of pneumatic cylinders;

viii) a pneumatic pressurizing system, wherein said footings rest horizontally on a floor or other surface with said legs extending vertically upward to engage attachment means on said horizontally-oriented leg extensions, said leg extensions being attached to, and supportive of, said front rail bed, said rear rail bed, and said backstop, whereby said rail beds underlie a plurality of slotted non-mar supports; and further, said pneumatic pressurizing system comprises a compressor, a supply line routine compressed air to a flow control valve, whereby said flow control valve ports said compressed air to said pneumatic cylinders, with a single said pneumatic cylinder being slidingly attached to the top surface of each horizontal leg extension, and wherein each said flip-up fixture/load plate contains a fixture mounting base, with said fixture mounting base having a means for linearly positioning said fixture mounting base along the top surface of said backstop and said fixture mounting base further enabling pivotable positioning of each flip-up fixture/load plate by means of adjustable fasteners imbedded in said fixture mounting base;

(b) determining the location of any attachment point(s) where a component is required to be affixed to said workpiece;

(c) placing the appropriate surface of said workpiece against said backstop of said work platform, while simultaneously positioning the end of said workpiece abut the endstop;

(d) securing said workpiece by means of said pneumatic cylinders;

(e) loading said component into the interior dimensions of said load plate and securely fastening said component therein by means of fastening devices;

(f) slidingly positioning said flip up fixture/load plate along said backstop by means for positioning a hole position locator and a linear tape measure;

(g) pivotably rotating said flip-up fixture/load plate into a horizontal orientation proximate said workpiece;

(h) securing said flip-up fixture/load plate onto a fixed position on said backstop by means of said adjustment screws; and (i) performing the required attaching operation by means of appropriate fasteners and powered equipment.

* * * * *